United States Patent [19]

Jackson, Jr. et al.

[11] Patent Number: 4,554,343

[45] Date of Patent: Nov. 19, 1985

[54] PROCESS FOR THE PRODUCTION OF HIGH MOLECULAR WEIGHT POLYESTER

[75] Inventors: Winston J. Jackson, Jr.; Joseph J. Watkins, both of Kingsport, Tenn.

[73] Assignee: Eastman Kodak Company, Rochester, N.Y.

[21] Appl. No.: 674,118

[22] Filed: Nov. 23, 1984

[51] Int. Cl.$^4$ .............................................. C08G 63/22
[52] U.S. Cl. .................................. 528/274; 528/302; 528/305; 528/480; 528/501
[58] Field of Search ............... 528/299, 302, 305, 501, 528/480, 272, 274

[56] References Cited

U.S. PATENT DOCUMENTS

| | | | |
|---|---|---|---|
| 2,901,466 | 8/1959 | Kibler et al. | 528/302 X |
| 3,004,067 | 10/1961 | Whitfield et al. | 562/485 |
| 3,033,822 | 5/1962 | Kibler et al. | 528/305 X |
| 3,523,923 | 8/1970 | Smith et al. | 528/302 X |
| 4,107,150 | 8/1978 | Campbell et al. | 528/302 X |
| 4,201,859 | 5/1980 | Agarwal | 528/302 |

*Primary Examiner*—Lucille M. Phynes
*Attorney, Agent, or Firm*—John F. Stevens; William P. Heath, Jr.

[57] ABSTRACT

Disclosed is a process for the preparation of high molecular weight polyesters comprising reacting substantially equimolar amounts of an acid component comprising at least one alicyclic or aromatic dicarboxylic anhydride or corresponding dicarboxylic acid with 1,3- or 1,4-cyclohexanedimethanol, at a temperature between about 110° C. and about 180° C. in a solvent, azeotropically removing water from the reaction mixture while condensing solvent vapor and returning it to the reaction mixture, and recovering the polyester after an inherent viscosity of at least 0.4 has been attained.

7 Claims, No Drawings

PROCESS FOR THE PRODUCTION OF HIGH MOLECULAR WEIGHT POLYESTER

TECHNICAL FIELD

This invention relates to a process for the production of high molecular weight polyesters from 1,3- or 1,4-cyclohexanedimethanol and alicyclic or aromatic dicarboxylic anhydrides or the corresponding dicarboxylic acids in a solvent system suitable for the azeotropic removal of the by-product water.

BACKGROUND OF THE INVENTION

Difficulty has been experienced in the past in producing high molecular weight polyesters from alicyclic or aromatic dicarboxylic anhydrides or their corresponding dicarboxylic acids (such as o-phthalic anhydride or o-phthalic acid). Much of this difficulty has been due to the fact that melt phase polymerization techniques have been used in which the ester groups tend to close up to revert back to the anhydride. Under the conditions of melt phase polymerization, the anhydride is volatile and vaporizes from the reaction system. Also, in the past, it has been common practice to use a molar excess of glycol. In polymerizations below 200° C., imbalances in the molar amounts of acid and glycol components used in this invention limit molecular weight build-up. Thus, by the present invention whereby substantially equimolar amounts of acid and glycol components are used, and a solvent system is used rather than a melt phase system, high molecular weight polyesters from these acids and glycols can be obtained.

We are aware of no prior art which discloses the preparation of high molecular weight o-phthalate polyesters by the process of this invention. U.S. Pat. No. 3,079,368 discloses a melt-fusion method for preparing o-phthalate polyesters. U.S. Pat. No. 3,457,236 discloses an improvement to the melt-fusion method for preparing o-phthalate polyesters. Several glycols involved in this invention are mentioned in U.S. Pat. No. 3,457,236. The process of this invention is markedly different from the methods disclosed in these patents and offers clear advantages over them.

In U.S. Pat. No. 3,457,236, column 3, lines 65-75, and column 4, lines 1-6, equipment is described which includes a heated condenser and heated distillation head necessary to prevent clogging of the column with phthalic anhydride. With our process, this equipment is not required as no phthalic anhydride is lost, and a simple condenser and trap will suffice. Also, the method of this patent requires equipment for application of vacuum. While vacuum equipment is convenient for solvent removal in our process, it is not strictly required as the polyester may be recovered by other means. In column 3, lines 37-40, it is stated that an excess of glycol is required. Our process represents a savings in materials as equimolar amounts of reactants are used and no discard or recovery of excess monomer is required. The solvent used in our process is not lost as it is easily recovered and reused. In column 3, lines 66-69, it is stated that the temperatures required range from 170-280° C. With our process, it is possible to prepare the polyester at a temperature as low as 110° C. This fact and the lack of a need to heat condenser or still heads represent an opportunity to realize significant savings in energy costs. By utilizing our process over the method disclosed in U.S. Pat. No. 3,457,236 to prepare high molecular weight o-phthalate polyesters, considerable savings in equipment and energy and additional savings in monomeric materials can be realized.

DISCLOSURE OF THE INVENTION

According to the present invention, there is provided a process for preparing a high molecular weight polyester suitable for use in forming shaped articles, said polyester having an I.V. of at least 0.4 (preferably at least 0.5) and containing repeating units from 1,3- or 1,4-cyclohexanedimethanol and at least one alicyclic or aromatic dicarboxylic anhydride or corresponding dicarboxylic acid having 6 to 30 carbon atoms. The process involves reacting the glycol and acid components at a temperature of about 110° C.-180° C. in an aromatic hydrocarbon solvent which forms an azeotrope with water. According to the process, substantially equimolar amounts of the glycol component and acid component are used.

In a preferred embodiment, the invention provides a process for the preparation of high molecular weight o-phthalate polyesters comprising reacting substantially equimolar amounts of an acid component comprising at least 50 mole %

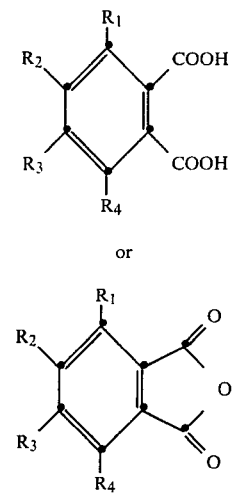

wherein $R_1$ through $R_4$ are each hydrogen, chlorine, bromine or alkyl groups containing 1 to 4 carbon atoms, with an aliphatic or cycloaliphatic glycol having at least six carbon atoms in the main chain, at a temperature between about 110° C. and about 180° C. in a solvent comprising benzene having 1 to 2 chlorine or alkyl substituents having 1 to 4 carbon atoms, azeotropically removing water from the reaction mixture while condensing solvent vapor and returning it to the reaction mixture, and recovering the polyester after an inherent viscosity of at least 0.4 has been attained.

The glycols used in the polyesters of this invention consist essentially of 1,3-cyclohexanedimethanol; 1,4-cyclohexanedimethanol, or mixtures thereof. Cis or trans configurations, or combinations thereof, may be used. These glycols are commercially available.

The acid component comprises at least 50 mole % of at least one alicyclic or aromatic dicarbocylic anhydride or corresponding dicarboxylic acid having 6 to 30 carbon atoms. The preferred acid component is o-phthalic acid or o-phthalic anhydride, which are commercially available materials. Other suitable acid components include 1,2-cyclohexanedicarboxylic anhydride; 4-cyclohexene-1,2-dicarboxylic anhydride; 2,3-norbornanedicarboxylic anhydride and 5-norbornene-2,3-dicarboxylic anhydride. The acid component may contain up to 50 mole % of an aliphatic dicarboxylic acid or anhydride having from 3 to 12 carbon atoms, an alicyclic dicarboxylic acid having 6 to 20 carbon atoms, or an aromatic dicarboxylic acid having 8 to 12 carbon atoms. Examples of these dicarboxylic acids include dimethylmalonic acid, adipic acid, 1,4-cyclohexanedicarboxylic acid, isophthalic acid, methylphthalic acid, chloroterephthalic acid, and dichloroterephthalic acid.

In preparing the polyesters according to the present invention, it is important to make sure anhydrides used as a reactant are completely dehydrated prior to use to insure an accurate determination of mole percentages. If the anhydride has been allowed to absorb water, accurate measurements are not possible. If the corresponding acids are used, they must be anhydrous for the same reason.

In a preferred embodiment, drying/dehydration is accomplished in the following manner. A carefully weighed amount of the anhydride, the appropriate amount of catalyst and the solvent are heated at solvent reflux for 1-2 hr with capture of the evolved water. The presence of the catalyst is necessary for completion of the dehydration of any dicarboxylic acid present. The amount of glycol required is then determined from the initial weight of the anhydride and the weight of the evolved water. After addition of this amount of glycol to the reaction vessel the preparation is completed in the normal manner.

The polyesters of this invention are prepared from substantially equimolar amounts of the glycol component and the acid component. In order to prepare high-molecular weight polyesters from these materials, a process is used which involves conducting the esterification/polyesterification reaction in a refluxing solvent in the presence of a catalyst and azeotroping out the water produced. The reactants are heated to a temperature of about 110 to about 180° C. in the refluxing solvent with removal of the by-product, water, and return of the condensed solvent vapors to the reaction vessel. After the theoretical yield of water has been collected, the solvent may be removed by distillation, or the hot mixture may be poured into a nonsolvent to precipitate the polyester, which is then collected on a filter and dried.

In forming the polyesters according to this invention, it is essential that substantially equimolar amounts of the glycol and acid components be used in the reaction mixture. Only slight imbalances of the acid and glycol will limit the molecular weight of the resulting polyesters. By the term "substantially equimolar amounts" it is meant that the mole percent of glycol and acid in the reaction mixture should be within 1% and preferably within 0.5% of each other.

A requirement for the solvent used as the reaction medium is that the finished polyester must be soluble therein. It is not necessary that the monomers be completely soluble in the solvent. Also, the solvent must form an azeotrope with water, but not with any of the monomers. Many conventional aromatic hydrocarbon solvents meet these requirements. Preferred solvents include those having boiling points of about 110° C.-180° C. such as benzene, and $C_1$-$C_4$ alkyl substituted benzenes, and chloro-substituted benzenes. Useful solvents include toluene, xylene, cumene, p-cymene, chlorobenzene, and o-dichlorobenzene. Fortunately, the anhydrides of this invention do not azeotrope out of the reaction mixtures with these solvents.

The catalysts used in preparing the polyesters according to this invention must cause the esterification and polyesterification reactions to proceed at lower temperatures than the conventional metallic melt-phase esterification catalysts. Acid catalysts are useful, and the preferred catalyst is n-butylstannoic acid. It is preferred because polyesters prepared with it have better long-term stability than polyesters prepared with other acid catalysts. Other useful catalysts include p-toluenesulfonic acid, sulfuric acid and methanesulfonic acid. The catalyst is present at levels of 0.1 to 5.0 wt. %, based on theoretical polymer yield, with about 1.0 wt. % preferred.

The polyesters of this invention can be injection molded by conventional techniques to produce transparent, shaped objects. The polyesters also can be extruded by conventional techniques into transparent films and sheeting. The polyesters also can be dissolved in solvents such as toluene, xylene, chlorobenzene or methylene chloride for the production of coatings.

The polyesters of this invention may also contain pigments, glass fibers, asbestos fibers, antioxidants, stabilizers, plasticizers, lubricants, and other additives.

Inherent viscosities are determined at 25° C. in 60/40 phenol/1,1,2,2-tetrachloroethane at a concentration of 0.5 g/mL.

The following examples are submitted for a better understanding of the invention.

EXAMPLE 1

Phthalic anhydride is heated at 200° C. at atmospheric pressure under nitrogen for two hours (to convert any phthalic acid present to the anhydride) before it is weighed into the reaction vessel. A mixture of 149.5 g (1.01 mole) phthalic anhydride, 145.6 g (1.01 mole) 1,4-cyclohexanedimethanol (30/70 cis/trans ratio), 2.70 g (1.0 wt %) p-toluenesulfonic acid and 50 mL xylene is placed into a 500 mL, three-neck, round-bottom flask equipped with a stirrer, a nitrogen inlet, and a Dean-Starke trap with condenser. The mixture is stirred at 138°-140° C. until the theoretical yield of water has been collected in the trap (11 hr). The trap is then removed, and a fitting with provision for application of vacuum is installed. Vacuum (0.2 mm Hg) is applied at 160° C. for 1.0 hr to remove the solvent. A viscous, transparent, light-amber polyester is obtained. The polyester has an inherent viscosity of 0.72 and a glass transition temperature of 58° C. (determined on a Perkin-Elmer DSC-2 differential scanning calorimeter.) A film pressed at 170° C. is transparent and tough.

The polyester is molded at 150° C. by conventional techniques to give transparent molded objects. The polyester is extruded at 180° C. by conventional tecniques to give transparent films.

The polyester is soluble in toluene, xylene, p-cymene, chlorobenzene, o-dichlorobenzene, and methylene chloride.

EXAMPLE 2

Following the procedure described in Example 1, omitting the initial heating step, a polyester is prepared from 1:1 molar ratio mixture of o-phthalic acid and 1,4-cyclohexanedimethanol (70/30 cis/trans ratio). The polyester is amber and transparent and has an I.V. of 0.48.

EXAMPLE 3

Following the procedure described in Example 1, a polyester is prepared from a 1:1 molar ratio mixture of phthalic anhydride and trans-1,4-cyclohexanedimethanol. The polyester is amber and transparent and has an I.V. of 0.61, and a glass transition temperature of 66° C. (determined on a Perkin-Elmer DSC-2 differential scanning calorimeter).

EXAMPLE 4

Following the procedure described in Example 1, a polyester is prepared from a 1:1:2 molar ratio mixture of 4-chlorophthalic anhydride, chloroterephthalic acid, and 1,4-cyclohexanedimethanol (30/70 cis/trans ratio). The polyester is dark amber and transparent and has an I.V. of 0.50.

EXAMPLE 5

Following the procedure described in Example 1, except omission of the initial heating step, a polyester is prepared from a 1:1 molar ratio mixture of 4-methylphthalic acid and 1,4-cyclohexanedimethanol (30/70 cis/trans ratio). The polyester is amber, transparent, and has an I.V. of 0.58.

EXAMPLE 6

A mixture of 59.2 g phthalic anhydride, 1.1 g p-toluenesulfonic acid and 100 ml xylene is placed into a 500-mL, three-neck, round-bottom flask equipped with a stirrer, a nitrogen inlet and a Dean-Starke trap with condenser. This mixture is stirred at 138°–140° C. for 2.0 hr. A 0.2 g quantity of water is collected, leaving a calculated 59.0 g (0.398 mol) phthalic anhydride in the flask. A 57.4 g quantity (0.398 mol) of (30/70 cis/trans) 1,4-cyclohexanedimethanol is added to the flask and a nitrogen atmosphere is established over the flask contents. The mixture is heated at 138°–140° C. for 12.0 hr and a 0.66 I.V. polyester is recovered by vacuum stripping the solvent.

EXAMPLE 7

Following the procedure described in Example 6, a polyester is prepared from a 1:1 molar ratio mixture of 1,2-cyclohexanedicarboxylic anhydride and (50/50 cis/trans) 1,3-cyclohexanedimethanol. The polyester is dark amber, transparent, and has an I.V. of 0.51.

EXAMPLE 8

Following the procedure described in Example 6, a polyester is prepared from a 1:1 molar ratio mixture of 2,3-norbornanedicarboxylic anhydride and (30/70 cis/trans) 1,4-cyclohexanedimethanol. The polyester is pale yellow, transparent, and has an I.V. of 0.81.

EXAMPLE 9

Following the procedure described in Example 1, except the use of 0.2 wt. % n-butylstannoic acid instead of 1.0 wt % p-toluene sulfonic acid as catalyst, a polyester is prepared from a 1:1 molar ratio mixture of phthalic anhydride and (30/70 cis/trans) 1,4-cyclohexanedimethanol. The polyester is amber, transparent and has an I.V. of 0.60.

The invention has been described in detail with particular reference to preferred embodiments thereof, but it will be understood that variations and modifications can be effected within the spirit and scope of the invention.

We claim:

1. Process for the preparation of high molecular weight polyesters comprising reacting substantially equimolar amounts of an acid component comprising at least 50 mole % of at least one alicyclic or aromatic dicarboxylic anhydride or corresponding dicarboxylic acid having 6 to 30 carbon atoms with 1,3-cyclohexanedimethanol, 1,4-cyclohexanedimethanol or mixtures thereof, at a temperature between about 110° C. and about 180° C. in a solvent comprising benzene having 1 to 2 chlorine or alkyl substituents having 1 to 4 carbon atoms, azeotropically removing water from the reaction mixture while condensing solvent vapor and returning it to the reaction mixture, and recovering the polyester after an inherent viscosity of at least 0.4 has been attained.

2. A process according to claim 1 wherein the acid component is a dicarboxylic acid.

3. A process according to claim 1 wherein the acid component is an anhydride.

4. A process according to claim 1 wherein the acid component comprises at least 90 mole % of an alicyclic or aromatic dicarboxylic anhydride or corresponding acid having 6 to 30 carbon atoms.

5. A process according to claim 1 wherein the glycol component consists essentially of 1,4-cyclohexanedimethanol.

6. A process according to claim 1 wherein the acid component comprises at least 50 mole %

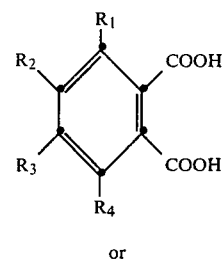

or

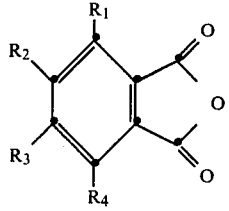

wherein $R_1$ through $R_4$ are each hydrogen, chlorine, bromine or alkyl groups containing 1 to 4 carbon atoms.

7. A process according to claim 3 wherein the anhydride is essentially completely dehydrated prior to reacting it with said glycol.

* * * * *